Figure 5:
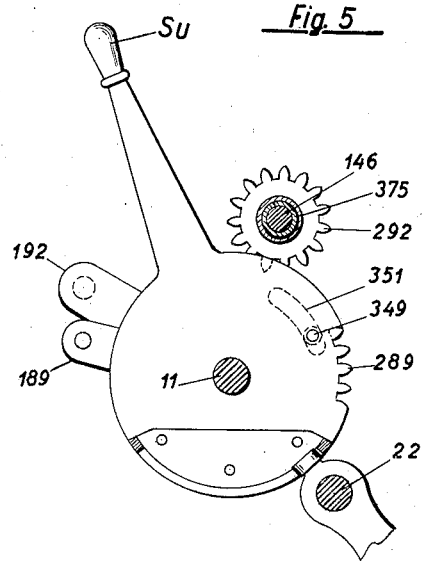

Nov. 22, 1938.  A. KLAAR  2,137,845
BLOCKING DEVICE FOR CASH REGISTERS, BOOKKEEPING MACHINES, OR THE LIKE
Filed Jan. 30, 1936  7 Sheets-Sheet 1
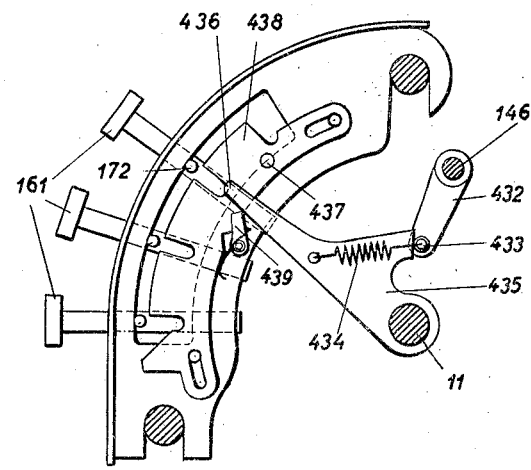
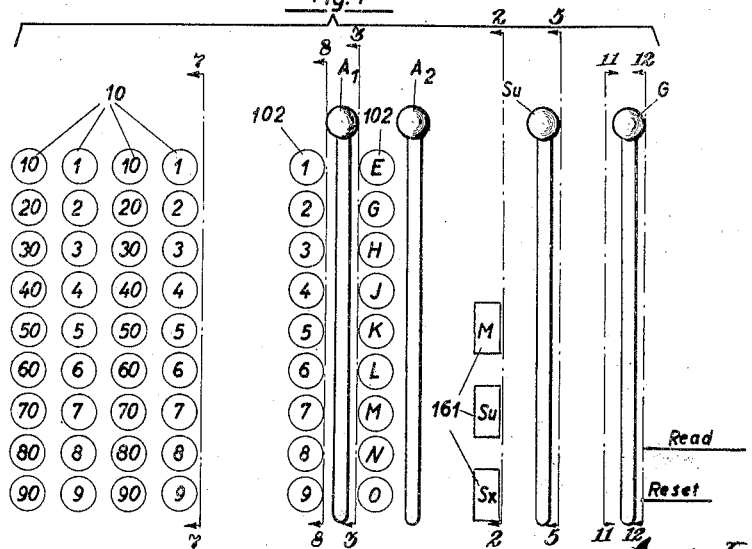

Nov. 22, 1938.    A. KLAAR    2,137,845
BLOCKING DEVICE FOR CASH REGISTERS, BOOKKEEPING MACHINES, OR THE LIKE
Filed Jan. 30, 1936    7 Sheets-Sheet 2
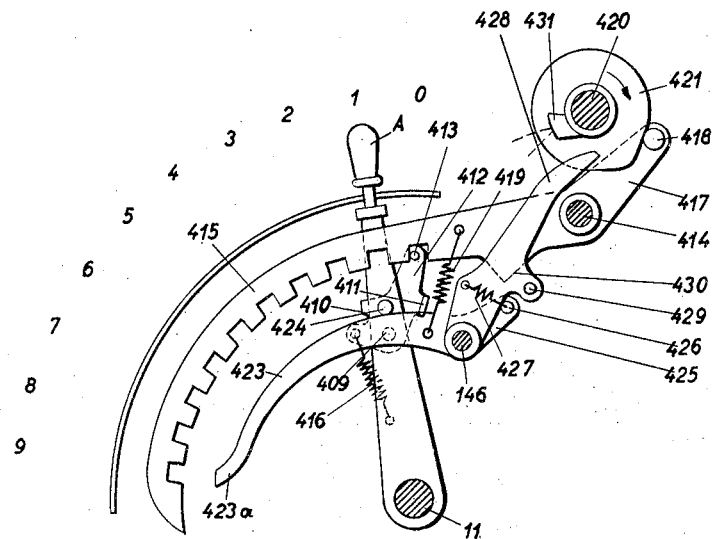
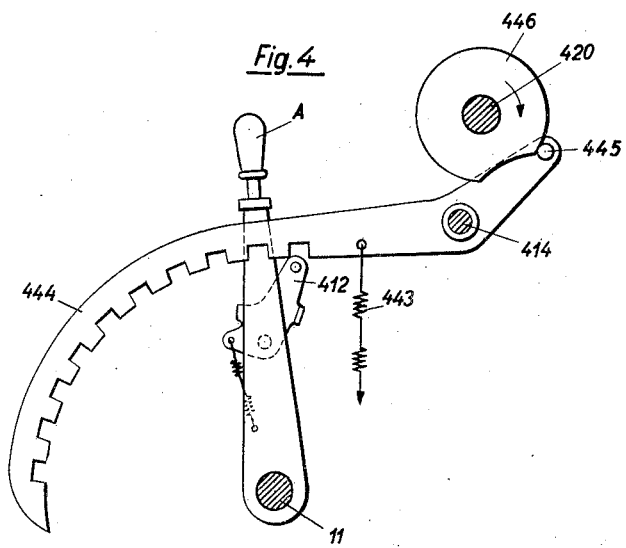

Nov. 22, 1938.  A. KLAAR  2,137,845
BLOCKING DEVICE FOR CASH REGISTERS, BOOKKEEPING MACHINES, OR THE LIKE
Filed Jan. 30, 1936  7 Sheets-Sheet 3

Nov. 22, 1938.                A. KLAAR                2,137,845
BLOCKING DEVICE FOR CASH REGISTERS, BOOKKEEPING MACHINES, OR THE LIKE
                    Filed Jan. 30, 1936        7 Sheets-Sheet 4
*Fig. 7*
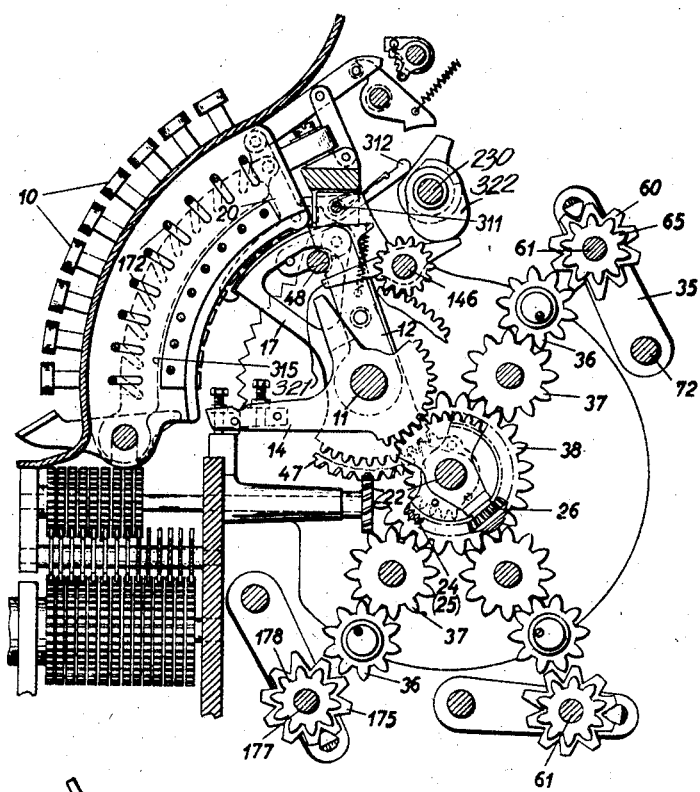
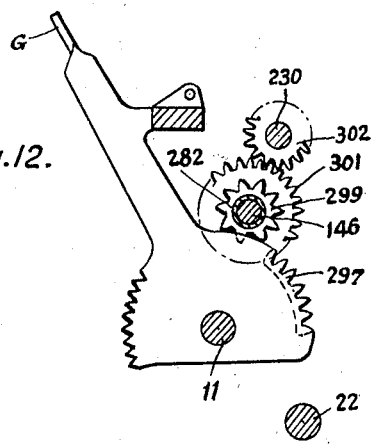
*Fig. 12.*
Inventor
Albert Klaar
By Knight Bros
His Attorneys Nov. 22, 1938.                     A. KLAAR                    2,137,845
BLOCKING DEVICE FOR CASH REGISTERS, BOOKKEEPING MACHINES, OR THE LIKE
                    Filed Jan. 30, 1936           7 Sheets-Sheet 6
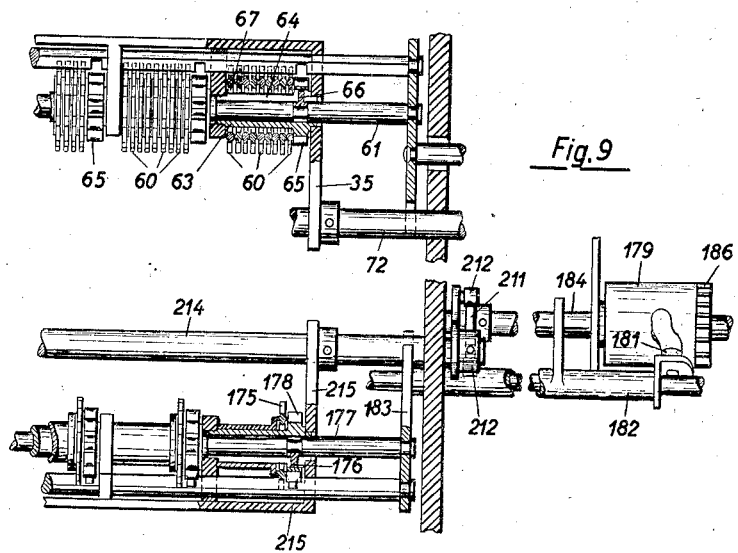
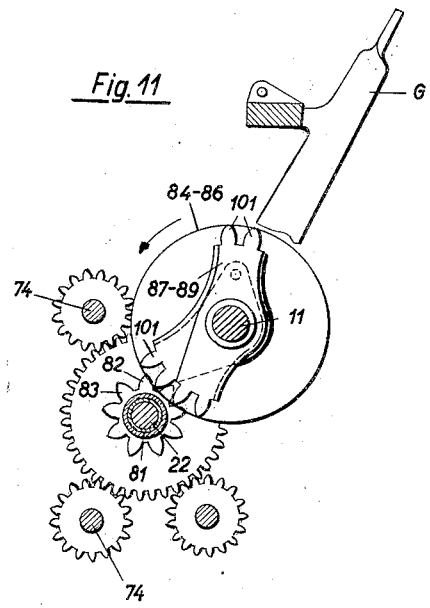

Nov. 22, 1938.  A. KLAAR  2,137,845
BLOCKING DEVICE FOR CASH REGISTERS, BOOKKEEPING MACHINES, OR THE LIKE
Filed Jan. 30, 1936  7 Sheets-Sheet 7

Inventor
Albert Klaar
By Knight Bros
His attorneys

Patented Nov. 22, 1938

2,137,845

UNITED STATES PATENT OFFICE 2,137,845

BLOCKING DEVICE FOR CASH REGISTERS, BOOKKEEPING MACHINES, OR THE LIKE

Albert Klaar, Bielefeld, Germany, assignor to Anker Werke A.-G., Bielefeld, Germany Application January 30, 1936, Serial No. 61,586
In Germany February 20, 1935

14 Claims. (Cl. 235—130)

This invention relates to a blocking device for cash registers, bookkeeping machines or the like.

There are known cash registers which have a plurality of adding totalizers and a special or master totalizer, the adding totalizers being arranged in groups, for instance according to class of tax and form of payment. At the close of business the totals are taken from these adding totalizers one group at a time and simultaneously the total of each adding totalizer is transmitted to the master totalizer. By comparing the two group totals formed successively in the master totalizer a proof of the correctness of the accounting is afforded. Patent 2,057,438 is an example of such machines.

With these known machines, the operator is free to take the totals from all of the totalizers of a group, or from only a part of them, or even to transmit totals from totalizers of both groups together to the master totalizer, so that a correct operation of the machine to check the accuracy of the accounting is not assured. This disadvantage is removed by the blocking device according to the present invention, which forces the operator to take the totals from all the totalizers of one group in succession and simultaneously to accumulate them in the master totalizer; then, before any other operation can be performed on the machine, to take the total from the master totalizer and cause it to be printed. When the taking of totals from another group of adding totalizers is begun, the operator is again forced to continue through all totalizers of the second group as before, accumulating the totals in the master totalizer and finally taking the total therefrom.

An illustrative form of the invention is shown in the drawings, wherein

Figure 6:
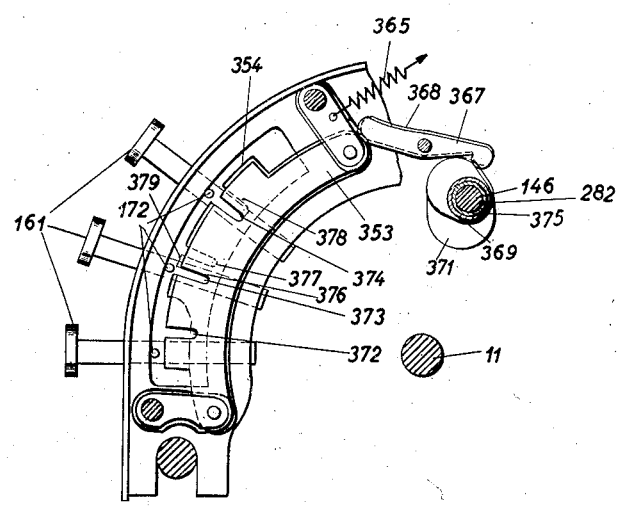
Figure 8:
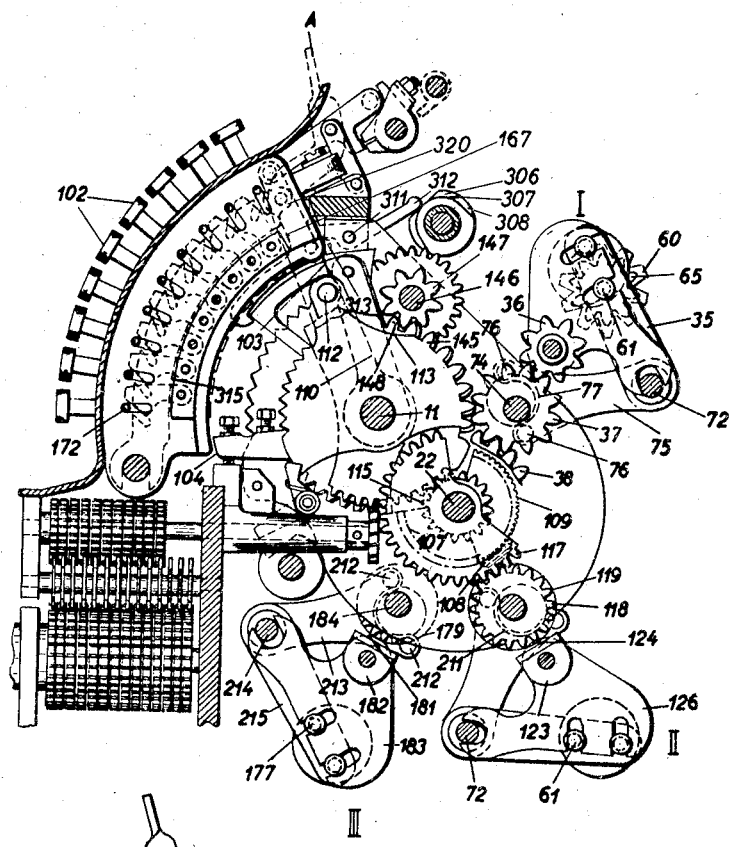
Figure 10:
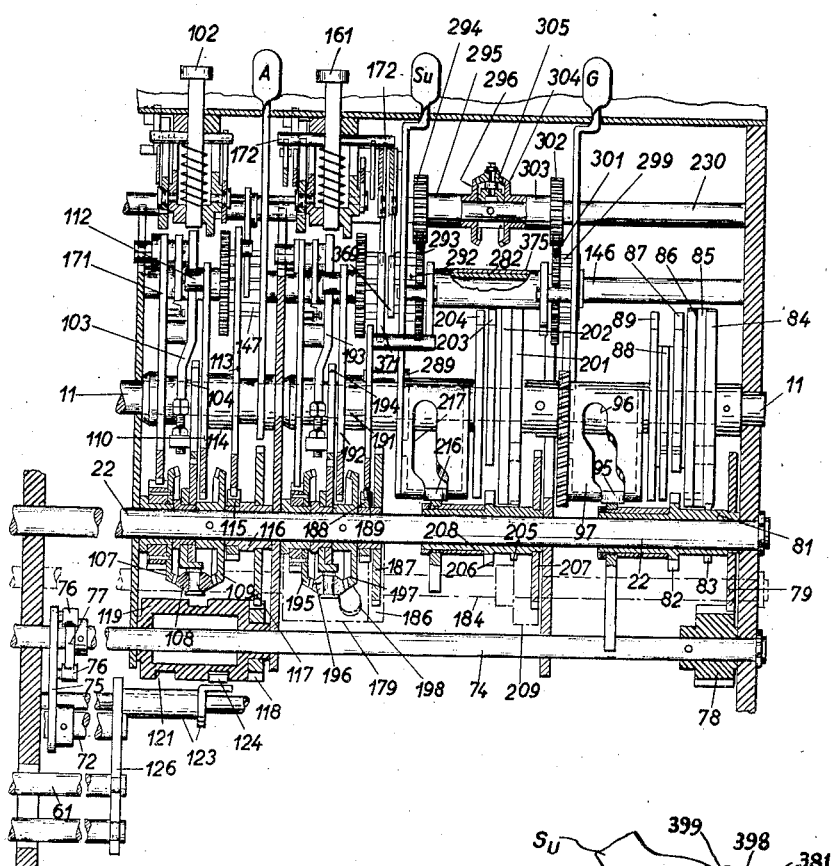

Fig. 1 is a diagrammatic view of the whole setting board,

Fig. 2 is a vertical section of a part of the setting and blocking mechanism on the line 2—2 of Fig. 1, Fig. 3 is a vertical section of a part of the setting and blocking mechanism on the line 3—3 of Fig. 1, Fig. 4 is a vertical section similar to Fig. 3 on a line slightly displaced from that of Fig. 3, Fig. 5 is a vertical section of part of the setting mechanism, on the line 5—5 of Fig. 1, Fig. 6 is a vertical section of part of the setting and blocking mechanism, on a line slightly displaced from the line 2—2 of Fig. 1, Fig. 7 is a vertical section on the line 7—7 of Fig. 1, showing the amount setting, differential, and totalizer mechanisms, Fig. 8 is a vertical section on the line 8—8 of Fig. 1, showing the setting mechanism for selecting the totalizers and appurtenant differential mechanism, Fig. 9 is a fragmentary front elevation partly in section of one of the adding totalizers and the master totalizer, Fig. 10 is a section along the main axis of the totalizer selecting differential mechanism, Fig. 11 is a vertical section on the line 11—11 of Fig. 1 showing the setting mechanism for determining the time of engagement of the adding totalizers, Fig. 12 is a vertical sectional view on the line 12—12 of Fig. 1, and Figs. 13, 14, and 15 are detail side views of the levers for selecting the adding totalizers and for setting the machine to take the total from the master totalizer, showing the blocking mechanism between them.

The machine is provided with two groups of adding totalizers I and II (Figs. 7 and 8), for instance for class of tax and form of payment, respectively; there being nine totalizers in each group; and also with a master totalizer in a separate group III. There are several rows of amount keys 10 (Fig. 1); two rows of adding totalizer selector keys 102, two adding totalizer selector levers A for selecting the adding totalizers in total taking; three motor release keys 161 (M, Su, Sx; a control lever Su for the setting, "Resetting master totalizer" and a control lever G for the setting, "Resetting adding totalizers."

Totalizer control

The two groups of adding totalizers, I and II, (Fig. 8) are controlled respectively by the two rows of adding totalizer selector keys 102. Each group of totalizers contains nine individual totalizers, group I being controlled by the selector keys 1—9 for the class of tax, and group II by the keys E—O for the form of payment. In each group of adding totalizers, the counting wheels 60 (Figs. 7 and 9) of the nine adding totalizers are arranged side by side on a shaft 61, the units counting wheels 60 of all the totalizers being in one group, the tens totalizers in a second group, and so forth. The adding wheels are rotatably mounted upon the hub 63 of an actuating wheel 65 (Figs. 8 and 9); the latter wheel being engaged, by swinging of the group of adding totalizers, with an intermediate wheel 36 meshing with a pinion 37, which engages a differential driving wheel 38 common to the same order of all the totalizers. The actuating wheels 65 can be connected to the counting wheels 60 of one of the nine adding totalizers of the group by means of couplings 66 (Fig. 9), which are rotatably but non-shiftably mounted upon shaft 61 and have noses which project through longitudinal slots 64 in the hubs 63 and come into engagement with the inner teeth 67 of the counting wheels 60. The couplings 66 are moved into engagement with the counting wheels to be selected by axial displacement of the shaft 61.

The displacement of the shaft 61 is executed by a stepped-cam drum 119 (Fig. 10), in the cam slot 121 of which engages a roller 124 mounted upon a sliding sleeve 123. The sleeve 123 is connected to a plate 126, which engages an annular groove in the shaft 61 in such a way that the latter is forced to follow the lateral movement of the plate 126, without being hindered in taking part in the swinging of the totalizer group into engagement, around the shaft 72 (Figs. 8 and 9).

The rotation of the drum 119 for selection of an adding totalizer is effected, in amount setting operations, by the driving mechanism of the machine, according to the setting of one of the keys 102 (Fig. 1) of the corresponding key bank. On total taking operations, the drum 119 is adjusted directly by hand by means of the appurtenant lever A.

The adding totalizer selector keys 102 are arranged in known manner, like the amount keys 10 and motor keys 161, concentrically to a shaft 11 (Fig. 8) upon which the main differential member 103 and the auxiliary differential member 104 are mounted. The members 103 and 104 are connected by means of a bevel wheel differential gear 107, 108, 109 (Figs. 8 and 10), mounted upon the shaft 22 (Fig. 8), in such a way that by rotation of the shaft 22, upon which the bevel pinion 109 is rigidly mounted, the differential members are made to engage the foot of the depressed key shaft 102 (Fig. 8) scissors-fashion, and by return rotation of shaft 22 they are restored. In this movement they engage between them a pin 112 (Figs. 8 and 10) of a setting member 110 for the display and type wheels, loosely mounted on shaft 11, and position this in accordance with the depressed key 102. The setting member 110 is rigidly connected by a hub 114 (Fig. 10) with a segment 113 (Figs. 8 and 10). The latter engages at the top by teeth 148 (Fig. 8) with a pinion 147 rotatably mounted upon a shaft 146. At the bottom the setting member has additional teeth engaging a gear 115 mounted upon shaft 22. The gear 115 is connected by a hub 116 (Fig. 10) with a toothed segment 117, which meshes with teeth 118 on the cam drum 119 of the corresponding group of adding totalizers. As a result of this arrangement, the rotation of shaft 22 which occurs during the machine operation, sets the drum 119 in accordance with the depressed key of the key bank 102, moving the coupling 61 laterally and connecting the actuating wheels 65 (Fig. 9) with the adding wheels corresponding to the depressed key 102.

The levers A₁ and A₂ loosely mounted on shaft 11 (Fig. 8) are provided at the rear with teeth 145, which cooperate with the pinion 147. In the position of rest of lever A, the segment of teeth 145 is out of engagement with the pinion 147, but as soon as the lever is moved from this position, the teeth 145 engage the pinion 147 and turn the latter, as well as the cam drum 119 positively connected therewith, in accordance with the key 102 beside which the lever A is set.

The amounts set by the amount keys 10 (Figs. 1 and 7) are transmitted through the amount differential member to the driving wheels 38 (Fig. 7). The amount differential mechanism is constructed like the differential mechanism of the adding totalizer selector key banks 102 just described. It comprises a main differential member 12 mounted upon shaft 11 and an auxiliary differential member 14, which are connected together by means of a differential gear 24, 26, 25 mounted upon shaft 22 in such a way that the differential members 12, 14 are caused by rotation of shaft 22 to engage the foot of the depressed key scissors-fashion. In this movement they set the setting member 47 connected to the display and type wheels (Fig. 7), by means of a pin 48, in a position corresponding to depressed key 10. Bevel wheels 24 of the differential gear, which are rigidly connected by segments 17 with the main differential members 12, are positively connected to driving wheels 38 common to all totalizer groups, so that the driving wheels 38 are set at each machine operation in accordance with the depressed key 10. In total taking the differential members operate in the manner shown in German Patent No. 569,493. The auxiliary differential member 14 is held by stop lever 321 at the beginning of the total taking operation, while the main differential member 12 moves for an extent determined by the position of the totalizer wheel with which the differential member is connected; then when the totalizer wheel reaches zero the stop lever 321 is thrown out of blocking position, while the main differential member 12 is blocked, thus causing the auxiliary differential member 14 to absorb the final movement of the driving mechanism. The blocking member 321 is normally held out of blocking position by cam 322 on shaft 230, but is rocked into blocking position by a spring (not shown) when cam 322 is turned by the setting of either lever Su or G. Further details of the operation of this mechanism will be found in the aforesaid German patent.

The engagement of actuating wheels 65 (Fig. 7) with the intermediate wheels 36 is brought about by rocking of shaft 72, to which the totalizer frame 35 is rigidly fastened. For this purpose a fixed arm 75 (Figs. 8 and 10) on shaft 72 embraces, by means of two rollers 76, an eccentric 77 fixed to a shaft 74. The two shafts 74 of the two adding totalizer groups I and II are connected by wheels 78 (Fig. 10) to a common wheel 79, which is fixed to a sliding sleeve 81 mounted upon shaft 22. The sleeve 81 carries driving and locking teeth 82, 83 (Figs. 10 and 11). The driving teeth 82 cooperate with three driving discs 87—89, each having two pairs of driving teeth 101. The locking teeth 83 coact with correspondingly selected locking discs 84—86, in the manner of a Maltese drive. The locking and driving discs 84—89 are rigidly fixed to shaft 11. The lever G on shaft 11 (Figs. 10 and 11) is rigidly connected to a stepped segment 97, in the stepped cam slot 96 which engages a roller 95. The bearing pin of this roller is rotatably but non-displaceably connected to sleeve 81. Through this mechanism the sleeve can be so adjusted by lever G that the teeth 82 and 83 come into the plane of any desired one of the three pairs of rocking and driving discs 84—89. During the machine operation, in which the shaft 11 executes a single rotation, the shaft 74 (Fig. 10) receives through the driving and rocking discs 84—85 to which the teeth 82, 83 are adjusted, a single revolution in two parts of 180° each, which operates in such a way through eccentric 77 upon the adding totalizer groups I and II (Fig. 8) that the latter are engaged by the first part of the movement and disengaged by the second part. The part movements occur at different times, according to which pair of driving and locking discs 84—89 (Fig. 10) is in engagement with the teeth 82, 83.

In the position of rest of the lever G (Figs. 10 and 11) the time of engagement and disengagement of the adding totalizer groups is determined by the discs 84, 87 for the operation "Adding"; in the position "Reading off" by the discs 85, 88 for the operation "Sub-total taking"; and in the position "Re-setting" by the discs 86, 89 for the operation "Final total taking". Consequently, in the first case (Adding) the engagement of the adding totalizers occurs before the beginning of the return movement of the differential driving members 38 (Fig. 8), the disengagement at the end of the return movement. In the second case, (Reading off) the engagement occurs before the beginning of the forward movement of the driving wheels 38 and the disengagement after the end of the return movement of the same. In the third case (Re-setting) the engagement occurs before the beginning of the forward movement of the driving wheels 38 and the disengagement after the end of the forward movement. In adding the amount set by the amount keys 10 is transmitted to the adding totalizer selected by the totalizer selector keys 102. In reading off the total contained in the adding totalizer selected by the lever A is transmitted to the display and printing mechanism, and the counting wheels are then returned to the position which they had before the beginning of the Reading off operation. In Re-setting the counting wheels remain in the zero position after the amount which they contained is transmitted to the display and printing mechanism.

The master totalizer is located in the part of the machine designated III (Fig. 8). The construction is similar to that of the adding totalizer groups I, II; however, instead of nine adding wheels there is provided in each order only a single counting wheel 175 (Fig. 9), which can be connected through a coupling 176, with the actuating wheel 178 cooperating with the appurtenant intermediate wheel 36, by displacement of the coupling shaft 177. The displacement of the coupling shaft for the purpose of engaging and disengaging the master totalizer is effected by means of a special stepped-cam drum 179 (Figs. 9 and 10), which is connected by a roller 181 (Fig. 8), a sliding sleeve 182, and a plate 183, with the coupling shaft 177, similarly to the way the stepped drum 119 is connected with the coupling shaft 61. The drum 179 (Figs. 9 and 10) is mounted upon a shaft 184 and stands in constant engagement with disc 189 through the intermediary of a ring of teeth 186 (Fig. 10), a segment 187 mounted on shaft 22, and a pinion 188 connected thereto. The disc 189 is rigidly connected by a hub 191 with the setting member 192 of the motor key bank 161.

The differential mechanism of the motor key bank 161 is constructed in the same fashion as the amount differential mechanism. The two differential members 193 and 194 (Fig. 10), which are interconnected by a differential gear 195, 196, 197, are brought up against the foot of the depressed motor key 161 from both sides by rocking of the shaft 22; thereby positioning the setting member 192, with the display and printing members connected therewith, in accordance with the displaced motor key. The stepped cam slot 198 of the drum 179 is so shaped, that the setting of the setting member 192 to the key M (Fig. 1) holds the master totalizer disengaged, while setting it to the keys Su and Sx causes the master totalizer to be engaged. The determination of the time of engagement of the master totalizer is effected by special locking and driving means 201—204 (Fig. 10), fastened to shaft 11, which cooperate in the manner of a Maltese drive with locking and driving teeth 205, 206 of a sliding bush 208 rigidly connected with a toothed wheel 207. The wheel 207 meshes with a toothed wheel 209 fixed to the shaft 184. The shaft 184 carries on its other end an eccentric 211 (Fig. 8) which coacts with two rollers 212 of an arm 213 fixed on the rock shaft 214 of the frame 215 of the master totalizer. The sliding sleeve 208 (Fig. 10) is connected through a roller 216 with a cam segment 217 rotatably mounted on shaft 11, to which segment is rigidly fastened the lever Su, which sets the time of engagement of the master totalizer. This control of the time of engagement works in a similar way to that for the adding totalizers. In the position of rest of the lever Su the teeth 205, 206 cooperate with the discs 201, 203 for adding, so that the amount by which the amount differential driving wheels 38 are moved under the control of keys 10, or by the taking of a total from one of the individual adding totalizers, is additively transmitted to the master totalizer; provided, that the drum 179 is set to "Engagement". In the position "Re-setting" of the lever Su the teeth 205, 206 cooperate with the discs 202, 204 for taking the final total, whereupon the amount contained in the master totalizer is transmitted to the display and printing mechanism and the master totalizer is set to zero.

The adjustment of the master totalizer to the operation "Total taking" is accomplished, as described, by setting the lever Su to "Re-setting". In order to couple the counting wheels 175 (Fig. 9) of the master totalizer with the appurtenant actuating wheels 178 before the beginning of the machine operation, there is provided on the lever Su a pin 349 (Fig. 5), which projects into a slot 351 of a disc 189 fixed to the setting member 192 (Figs. 5 and 10) of the motor key bank 161. The slot 351 does not interfere with the setting of the setting member according to the displaced motor key, when the lever Su is in its position of rest. On the other hand, if the latter is adjusted to the position, "Re-setting" the pin 349 engages the rear end of the slot 351 and carries the setting member 192 into a position in which the master totalizer cam drum 179 (Fig. 9) is moved to the coupling position.

Blocking mechanism

Each totalizer selector lever A (Figs. 1 and 3) carries a pawl 412 rotatably mounted on a pin 409 and provided with projections 410 and 411. A pin 413 on the pawl cooperates with a curved rack bar 415 rockably mounted upon a shaft 414. The pawl 412 is under the influence of a tension spring 416. The rack bar 415 has an arm 417 provided with a roller 418 held by a spring 419 in contact with a cam disc 421 fixed upon a shaft 428, which executes one revolution in each machine operation.

On a shaft 146 is loosely mounted a lever 423 which rests against a pin 424 on totalizer selector lever A by the pull of the spring 419. An arm 425 of lever 423 carries a pin 426 against which lies a lever 428 under the pull of a spring 427. The lever 428 is rigidly fixed to shaft 146 and carries a pin 429 which cooperates with a projection 430 on the rack bar 415. The upper end of lever 428 is moved, in a manner described later, into the path of a cam 431 fixed upon the shaft 420. Upon shaft 146 is rigidly fastened an arm 432 (Fig. 2), in which is riveted a pin 433. A lever 435 comes to rest against the pin 433 under the pull of a spring 434. The upper end 436 of lever 435 cooperates with a pin 437 on a locking slide 438. A pawl 439 under the influence of a weak spring holds the locking slide 438 in either of its two positions. The keys 161 are provided with pins 172, which are adapted to cooperate with the locking slide 438. Upon the shaft 414 is loosely mounted a second rack bar 444 (Fig. 4) under the influence of a tension spring 443. A roller 445 on lever 444 rests against a cam disc 446 fixed to shaft 420. The notches of rack bar 444 are somewhat displaced with reference to those of rack bar 415.

Between the setting means 10, 102, A₁, A₂, 161, Su, G, there may be provided blocking means, such as shown in Patent 2,057,438, which prevent the totalizer selector levers A₁ and A₂, the release key Sx and the control levers Su and G from being set when an amount key 10 has been depressed. These locking means further prevent the setting of more than one of the totalizer selector levers A during total taking from the totalizers 1—9 and E—O, and also lock the keys 10, 102, M and Sx, as well as the control lever Su at this time. The mechanism for performing the latter functions will now be described.

Figure 13:
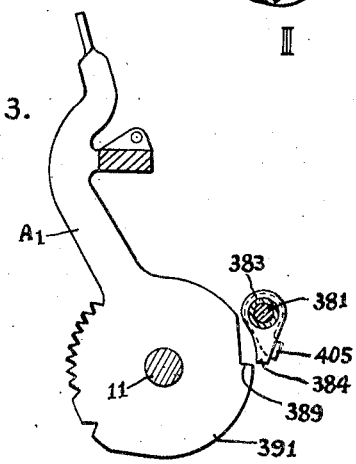
Figures 14, 15:
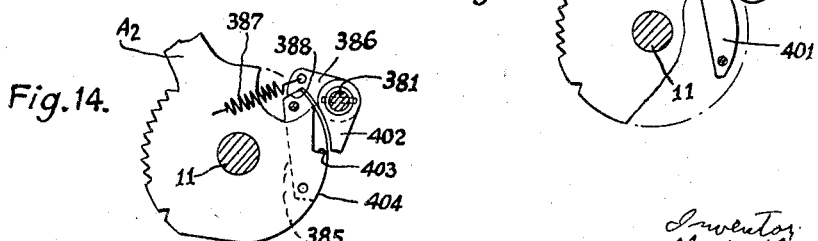

Referring to Figs. 13, 14, and 15, there is mounted behind the levers A₁, A₂, and Su, a shaft 381, which is constantly urged by a spring (not shown) in counterclockwise direction. Upon this shaft there is a rocking sleeve 383, provided, in the plane of the selecting lever A₁, with a fixed arm 384. In the position of rest of the lever A₁ a notch 389 stands opposite the arm 384, so that the latter can swing inward to engage the notch, when the lever A₁ is in position of rest, while a circular periphery 391 of the lever A₁ prevents the arm 384 from swinging in when the lever is in any other position. Upon the opposite end of sleeve 383, in the plane of lever A₂, is a pawl 386, to which is connected a tension spring 387 normally holding the pawl 386 in the position shown in Fig. 14. In the position of rest of selecting lever A₂ an abutment 385 stands with its upper edge 388 under the nose of pawl 386. When the selecting lever A₂ is moved out of its position of rest, the pawl 386 is pushed in clockwise direction and swings the arm 384 into notch 389 in lever A₁, thereby locking the latter in the position of rest. If the lever A₁ is out of position of rest, the lever A₂ is prevented from moving, by pawl 386.

Fixed to shaft 381 in the plane of lever Su is a pawl 398. The nose of pawl 398 engages the upper surface 399 of an abutment 401 fixed to lever Su. In the plane of lever A₂ there is fixed to the shaft 381 an arm 402, which stands opposite a notch 403 when the lever is in position of rest. There is also fixed to shaft 381 in the range of the lever A₁ an arm 405 having a bent over end which lies against the arm 384. The above-mentioned spring (not shown) holds the shaft 381 in the position shown in Figs. 13–15, wherein the pawl 398 engages the abutment surface 399. When the lever Su is moved out of position of rest, the pawl 398 is moved clockwise and throws arms 402 and 384 into notches 403 and 389 respectively, thereby locking levers A₁ and A₂ in position of rest. If either of the levers A₁ or A₂ is not in position of rest, the lever Su is prevented from moving by the pawl 398.

In the range of each bank of amount keys 10 (Fig. 7) there is provided a blocking slide 315, provided with inclined slots in its upper surface and connected at its upper end by a pin 320 with a zero stop pawl 20. This pawl has a downwardly extending hook engaging the nose of segment 17 fixed to the main differential member 12. When a key 10 is depressed, the slide 315 is cammed upward by engagement of its pin 172 with the side of the corresponding slot, whereas, if the zero stop pawl 20 is swung clockwise by means to be described presently, no key 10 can be displaced, because the oblique slots of slide 315 are moved out of alignment with the pins 172.

In the range of the adding totalizer selector keys 102 (Fig. 8) there is provided a similar slotted slide 315 connected at 320 to a zero stop pawl 167. The zero stop pawls 20 and 167 are each provided with rearwardly projecting tails 313 upon which bear the forwardly projecting noses of levers 312 pivoted at 311. The rearwardly extending arms of levers 312 bear against cam discs 306, 307, 308 fixed upon a shaft 230. Between the levers Su and G there is fixed to shaft 230 (Fig. 10) a stub shaft 300 bearing a planet wheel 305 cooperating with sun wheels 296 and 304 of a differential gear. The gear 296 is fixed to a hub 295 rotatably mounted on shaft 230, the opposite end of which bears a gear 294 meshing with a gear 293 rotatably mounted on shaft 146. Fixed to gear 293 is a pinion 292, which cooperates with a set of teeth 289 on lever Su (Fig. 5). When the lever Su is moved down to the position "Re-setting", the pinion 292 is engaged by teeth 289 and rotated, thereby rocking the planet wheel 305 and turning shaft 230. The cams 306, 307, and 308 are thereby turned into a position which swings the pawls 312 counter-clockwise (Figs. 7 and 8) and, through the zero stop pawls 20 and 167, moves slides 315 up to a position which blocks the keys 10 and 102. A similar adjustment is effected by movement of the lever G, through a set of teeth 297 (Fig. 10) on that lever engaging a pinion 299, a toothed wheel 301 fixed to the pinion, a toothed wheel 302 meshing with wheel 301, a rotary hub 303 fixed to wheel 302, and the sun wheel 304 connected to the hub.

The pinion 292 is connected by a sleeve 375 (Fig. 6) with a cam 369. The cam 369 acts through a lever 367 to move downward a slide 353 held up by spring 365 and having slots 374, 373, 372 so related to pins 172 on the shafts of motor keys 161 that in the bottom position of the slide the key Sx is free to move, while the keys M and Su are blocked; whereas, in the upper position of slide 353 the key Sx is blocked and the keys M and Su are free.

Pinion 299 (Fig. 10) is connected by a sleeve 282 rotatably mounted on shaft 146 with a cam 371 (Fig. 6). This cam acts through a lever 368 against a slide 354 normally held in upper position by a spring (not shown) similar to spring 365. The slide 354 has blocking surfaces interrupted by slots 378, 377, and 376. Between the latter two slots is a blocking surface 379. In the position of rest of the key G, which controls the slide 354 through the mechanism just described, both the keys M and Su are released. Slide 354 has no blocking surface for key Sx. In the position "Reading off" the key M is released while the key Su is blocked by the surface 379. In the position "Re-setting" the key M is blocked and the key Su is released by slot 377.

The device described operates in the following manner:

For registering an individual amount, the amount keys 10 are first depressed, then one key in each of the groups 1—9 and E—O, whereupon by depression of the release key M, the machine operation is started. However, if a taxpayer pays in several taxes, instead of the release key M, the release key Su is operated, for in this case the total payment of the taxpayer is to be registered, which is done by the master totalizer, and this is thrown in by depression of the release key Su. The total formed in the master totalizer is taken by pulling the control lever Su into the position "Re-setting" and punching the motor key Sx.

When the correctness of the accounting is to be determined at the close of the business period, at which time the totalizers of the groups I and II are to be zeroized, first the control lever G is moved into the position "Re-setting" and the totalizer selector lever A which controls the totalizers 1—9 is moved from its normal position into the position "1". A movement to any other position than the position "1" is impossible because the pawl 412, by means of its projections 410 and 411, in cooperation with the notches of the rack bar 415, permits a movement of the totalizer selector lever A for only one division. Movement of lever G to position "Re-setting" blocks motor key M by slide 354 and releases key Su, while key Sx remains blocked by slide 353. The lever Su is held in position of rest by pawl 398. The keys 10 and 102 are blocked by their slides 315. By depression of the release key Su, the master totalizer is engaged and at the same time the machine operation is started, so that the total withdrawn from the totalizer is positively transferred to the master totalizer.

Shortly before the end of the machine operation, the disc 421 turns the rack bar 415 clockwise and thereby releases the pin 413 of pawl 412, which first is swung by the pull of spring 416 only to the somewhat displaced first notch of rack bar 464, but which immediately after the pin 445 has left the notch of disc 446 moves further until its projection 411 comes against the lever A1. The rack bar 415 going back under the pull of spring 419 embraces the pin 413 of pawl 412 in its second notch. The notches of lever 444 consequently prevent the lever A1 from being pulled through during the machine operation at the moment when the rack bar 415 is raised, because the roller 445 moves into the notch of the disc 446 under the action of spring 443.

On the passage of the lever A1 from the position 8 to the position 9, the pin 424 of lever A1 engages a nose 423a of lever 423 and moves the lever 428 by means of pin 426 into the path of cam 431 and at the same time moves the pin 429 against the projection 430. In the course of the machine operation, cam 431 engages lever 428 and pin 429 swings the rack bar 415 in clockwise direction. The rack bar 415 is prevented from returning to its original position until the following machine operation, because as Fig. 3 shows, the lever 428 stands in front of cam 431, (dotted line position). By turning of the lever 428 counter-clockwise, the shaft 146 is also turned and takes with it the arm 432 (Fig. 2), which latter brings the upper end 436 of lever 435 into contact with pin 437, through the action of a spring 434. However, a motion of the locking slide 438 cannot follow, for the release key Su is only released shortly before the end of the machine operation, in the usual manner. At that time the locking slide 438 is pulled upward by the action of the spring 434 and thereby key Su is locked.

Now in order to print the sum of the totals accumulated in the adding totalizer group 1—9 the adding totalizer selector lever A1 is brought back to its position of rest and the lever Su is moved into the position "Re-setting". Thereby the levers A are locked in position of rest by the arms 384 and 402. The amount keys 10 and totalizer selector keys 102 are blocked by the slides 315. The keys M and Su are blocked by the slide 353 and the key Sx released by slot 372. Therefore the operator must depress the key Sx to take the total from the master totalizer. After the total has been taken from the group of adding totalizers 1—9, there follows the taking of the total from the group E—O, in the manner just described. Attention is again called to the fact that the parts 409—431 (Fig. 3) and 443—446 (Fig. 4) are provided for each adding totalizer selector lever A.

After the total is again taken from the master totalizer the lever Su is again returned to its position of rest. The locking slide 353 is pulled up by the spring 365, so that the keys M and Su are again released, while the key Sx is blocked. The blocking of the keys M and Su by the slide 438 had already been removed by the depression of the key Sx, due to the pin 172 acting upon the inclined surface of the slide and pushing it down.

It is evident that the described device prevents any false operation by the operator in totalizing.

I claim:

1. A machine of the class described, comprising a set of totalizers, means for taking totals from said totalizers, manually operated setting means for selecting said totalizers for engagement with said total taking means, blocking means limiting the change of said setting means after each machine operation to the selection of one particular totalizer of said set, and means progressing said blocking means at each machine operation to require a sequential selection of said totalizers.

2. A machine of the class described, comprising a plurality of totalizers; means for taking totals from said totalizers; setting means for selecting said totalizers for engagement with said total taking means, comprising a manipulative element adjustable to different positions corresponding to the respective totalizers; means blocking movement of said element beyond the distance between two adjacent positions; and means for advancing the field of control of said blocking means at each machine operation.

3. A machine of the class described, comprising a plurality of totalizers; means for taking totals from said totalizers; setting means for selecting said totalizers for engagement with said total taking means; comprising a manipulative element adjustable to different positions corresponding to the respective totalizers; a pawl on said element; means cooperating with said pawl to limit the movement of said element to the distance between two adjacent positions; and means for advancing the field of control of said limiting means at each machine operation.

4. A machine of the class described, comprising a plurality of totalizers; means for taking totals from said totalizers; setting means for selecting said totalizers for engagement with said total taking means, comprising a manipulative element adjustable to different positions corresponding to the respective totalizers; a pawl on said element having a limited movement with respect to said element; a pair of independently movable rack bars lying side by side and having relatively offset notches, said pawl having a projection cooperating with said notches in the manner of an escapement; and means for moving said rack bars in each machine operation to allow said pawl to advance and permit a further movement of said setting element.

5. A machine of the class described, comprising a plurality of totalizers; means for taking totals from said totalizers; setting means for selecting said totalizers for engagement with said total taking means, comprising a manipulative element adjustable to different positions corresponding to the respective totalizers; a pawl on said element having a limited movement with respect to said element; a pair of independently movable rack bars lying side by side and having relatively offset notches, said pawl having a projection cooperating with said notches in the manner of an escapement; and means for moving said rack bars successively clear of said projection once in each machine operation to permit said projection to advance by steps to the next notches of said rack bars.

6. A machine of the class described, comprising a group of adding totalizers; a master totalizer; means for transferring totals from said adding totalizers to said master totalizer; means for taking totals from said master totalizer; first setting means for setting the machine to transfer totals from said adding totalizers to said master totalizer, including selecting means for the individual engagement of said adding totalizers with said transferring means; second setting means for setting the machine to take the total from said master totalizer; interblocking means between said setting means, comprising means preventing operation of said second setting means when said first setting means is displaced from normal position; and means blocking said selecting means against operation in other than a predetermined sequence.

7. A machine of the class described, comprising a group of adding totalizers; a master totalizer; means for transferring totals from said adding totalizers to said master totalizer; means for taking totals from said master totalizer; first setting means for setting the machine to transfer totals from said adding totalizers to said master totalizer, including selecting means for the individual engagement of said adding totalizers with said transferring means; second setting means for setting the machine to take the total from said master totalizer; interblocking means between said setting means, comprising means preventing operation of said second setting means when said first setting means is displaced from normal position; means for blocking said first setting means; and means operated by the driving mechanism of the machine and controlled by the setting of said selecting means to the last adding totalizer, for moving said last blocking means to operative position.

8. A machine of the class described, comprising a group of adding totalizers; a master totalizer; means for transferring totals from said adding totalizers to said master totalizer; means for taking totals from said master totalizer; first setting means for setting the machine to transfer totals from said adding totalizers to said master totalizer, including selecting means for the individual engagement of said adding totalizers with said transferring means and a machine release key; second setting means, including a machine release key, for setting the machine to take the total from said master totalizer; means for blocking said selecting means against operation in other than a predetermined sequence; means for blocking said first machine release key; means operated by the driving mechanism of the machine and controlled by the setting of said selecting means to the last adding totalizer, for moving said last blocking means to operative position; and means whereby said last blocking means is restored to inoperative position by operation of said second machine release key.

9. A machine of the class described, comprising a plurality of totalizers, means for taking totals from said totalizers, setting means for selecting said totalizers for engagement with said total taking means, means operating in the manner of an escapement mechanism for confining the movement of said selecting means to a step by step movement from one position to the next after each machine operation, said last means being adapted normally to prevent retrograde movement of said selecting means, and means controlled by the setting of said selecting means to one of said totalizers for releasing said selecting means for restoration to starting position.

10. A machine of the class described, comprising a group of adding totalizers; a master totalizer; means for adding amounts in said adding totalizers; means for transferring totals from said adding totalizers to said master totalizer; means for taking totals from said master totalizer; a first setting means to set the machine for adding amounts to said adding totalizers; a second setting means to set the machine for transferring totals from said adding totalizers to said master totalizer, including selecting means for said adding totalizers; a third setting means to set the machine to take the total from said master totalizer; inter-blocking means between said setting means, comprising means preventing operation of said first and third setting means when said second setting means is displaced from its position of rest; and means positively blocking said selecting means against operation in other than a predetermined sequence including said entire group of adding totalizers.

11. A machine of the class described, comprising a group of adding totalizers; a master totalizer; means for adding amounts in said adding totalizers; means for transferring totals from said adding totalizers to said master totalizer; means for taking totals from said master totalizer; a first setting means to set the machine for adding amounts to said adding totalizers; a second setting means to set the machine for transferring totals from said adding totalizers to said master totalizer, including selecting means for said adding totalizers; a third setting means to set the machine to take the total from said master totalizer; inter-blocking means between said setting means, comprising means preventing operation of said first and third setting means when said second setting means is displaced from its position of rest; means confining said selecting means to a definite sequence of selections including said entire group of adding totalizers, said confining means being adapted to prevent the return of said selecting means to starting position before said sequence is finished; mechanism for rendering said confining means inoperative, said mechanism being prepared for operation by movement of said selecting means to select the last adding totalizer of said sequence; and means moved by the driving mechanism of the machine for completing the operation of said mechanism after it has been prepared.

12. A machine of the class described, comprising a group of adding totalizers; a master totalizer; means for adding amounts in said adding totalizers; means for transferring totals from said adding totalizers to said master totalizer; means for taking totals from said master totalizer, a first setting means to set the machine for adding amounts to said adding totalizers; a second setting means to set the machine for transferring totals from said adding totalizers to said master totalizer, including selecting means for said adding totalizers; a third setting means to set the machine to take the total from said master totalizer; inter-blocking means between said setting means, comprising means preventing operation of said first and third setting means when said second setting means is displaced from its position of rest; means confining said selecting means to a definite sequence of selections including said entrire group of adding totalizers, said confining means being adapted to prevent the return of said selecting means to starting position before said sequence is finished; mechanism for rendering said confining means inoperative, said mechanism being prepared for operation by movement of said selecting means to select the last adding totalizer of said sequence; means moved by the driving mechanism of the machine for completing the operation of said mechanism after it has been prepared, said last means comprising a cam having a movement during each operation of the machine, and a lever adapted to be moved into the path of said cam by said selecting means, said cam in its position of rest being adapted to hold said lever in position to render said confining means inoperative until the next operation of the machine.

13. A machine of the class described, comprising a group of adding totalizers; a master totalizer; means for adding amounts in said adding totalizers; means for transferring totals from said adding totalizers to said master totalizer; means for taking totals from said master totalizer; a first setting means to set the machine for adding amounts to said adding totalizers; a second setting means to set the machine for transferring totals from said adding totalizers to said master totalizer, including selecting means for said adding totalizers; a third setting means to set the machine to take the total from said master totalizer; interblocking means between said setting means, comprising means preventing operation of said first and third setting means when said second setting means is displaced from its position of rest; means confining said selecting means to a definite sequence of selections including said entire group of adding totalizers, said confining means being adapted to prevent the return of said selecting means to starting position before said sequence is finished; mechanism for rendering said confining means inoperative, said mechanism being prepared for operation by movement of said selecting means to select the last adding totalizer of said sequence; means moved by the driving mechanism of the machine for completing the operation of said mechanism after it has been prepared, locking means for said first and second setting means, and means set in operation by said selecting means on selecting the last totalizer of said sequence for cocking said locking means, said locking means being restrained from moving from cocked to locking position by said setting means in set position and released upon movement of said setting means to position of rest.

14. A machine of the class described, comprising a group of adding totalizers; a master totalizer; means for adding amounts in said adding totalizers; means for transferring totals from said adding totalizers to said master totalizer; means for taking totals from said master totalizer; a first setting means to set the machine for adding amounts to said adding totalizers; a second setting means to set the machine for transferring totals from said adding totalizers to said master totalizer, including selecting means for said adding totalizers; a third setting means to set the machine to take the total from said master totalizer; inter-blocking means between said setting means, comprising means preventing operation of said first and third setting means when said second setting means is displaced from its position of rest; means confining said selecting means to a definite sequence of selections including said entire group of adding totalizers, said confining means being adapted to prevent the return of said selecting means to starting position before said sequence is finished; mechanism for rendering said confining means inoperative, said mechanism being prepared for operation by movement of said selecting means to select the last adding totalizer of said sequence; means moved by the driving mechanism of the machine for completing the operation of said mechanism after it has been prepared, locking means for said first and second setting means, means set in operation by said selecting means on selecting the last totalizer of said sequence for cocking said locking means, said locking means being restrained from moving from cocked to locking position by said setting means in set position and released upon movement of said setting means to position of rest, and means whereby said third setting means restores said locking means to inoperative position.

ALBERT KLAAR.